Sept. 14, 1965   C. H. BIBER   3,205,798
SHUTTER TIMING APPARATUS AND METHOD
Filed March 29, 1963   2 Sheets-Sheet 1

INVENTOR.
Conrad H. Biber
BY Brown and Mikulka
and
Donald M. Sandler
ATTORNEYS

Sept. 14, 1965 C. H. BIBER 3,205,798
SHUTTER TIMING APPARATUS AND METHOD
Filed March 29, 1963 2 Sheets-Sheet 2

INVENTOR.
Conrad H. Biber
BY Brown and Mikulka
and
Donald M. Sandler
ATTORNEYS

United States Patent Office 3,205,798
Patented Sept. 14, 1965

3,205,798
SHUTTER TIMING APPARATUS AND METHOD
Conrad H. Biber, Needham, Mass., assignor to Polaroid Corporation, Cambridge, Mass., a corporation of Delaware
Filed Mar. 29, 1963, Ser. No. 269,115
15 Claims. (Cl. 95—10)

This invention relates to shutter control means for controlling the exposure time of a camera, and more particularly to shutter control means of the type that is responsive to light from a scene being photographed for causing the exposure time to be functionally related to the level of scene brightness.

One recently developed shutter control means of the type described is provided with shutter operator means actuatable to cause the shutter means of the camera to initiate exposure, and deactuatable to cause it to terminate exposure, so that the exposure is essentially the time that said shutter operator means is actuated. To control this time, the control means is further provided with shutter timing apparatus including a voltage sensitive trigger circuit for actuating and deactuating the shutter operator means; and an R-C circuit having, as a component, a photoconductive element whose resistance is functionally related to the level of brightness of a scene to which the element is exposed. When the R-C circuit is activated substantially at the same time the trigger circuit actuates the shutter operator means, it generates a time variable voltage that reaches a trigger voltage in a period of time dependent upon the parameters of the R-C circuit including the resistance of the element as established by the level of scene brightness.

The voltage sensitive trigger circuit includes a transistor stage, the input signal of which is the time variable voltage of the R-C circuit. Such voltage causes the stage base to be reverse biased until the trigger voltage is reached, and when this occurs the stage is forward biased into conduction. During the time that this stage is reverse biased, the voltage sensitive trigger circuit is effective to actuate the shutter operator means; and when the stage conducts, it causes the trigger circuit to deactuate the shutter operator means, so that the actual exposure time, as established by the actuation time of the shutter operator means, is essentially the time required by the R-C circuit, after activation, to generate the trigger voltage.

One of the problems associated with cameras utilizing shutter control means of the type described is the exposure error at low levels of brightness, which for the purpose of this invention may be considered as levels less than 1 candle/ft.² With a nonlinear photoconductive element, which is to say an element whose static brightness response is different from the brightness response of the film, it is known that the amount of underexposure of the film increases as the level of brightness decreases. However, at low light levels it has been found that sometimes the shutter control means causes the exposure time to be so short that excessive underexposure results; and sometimes the shutter control means is actually ineffective to cause deactuation of the shutter operator means and termination of exposure so that overexposure can result. It is therefore a primary object of this invention to provide improved shutter control means of the type described which does not perform, under low levels of scene brightness, in the erratic manner above described.

Briefly, the invention involves the recognition that, under reverse bias conditions, a leakage current flows through the transistor stage and serves to decrease the time for the R-C circuit to generate the trigger voltage. Where the resistance of the photoconductive element is high, as at low levels of scene brightness, the leakage current is a substantial percentage of the transient current that flows through the element in response to activation of the R-C circuit. Having recognized that the trigger generation time is reduced by the flow of leakage current, the invention involves the selection of a transistor of the type having a leakage current associated therewith which is substantially smaller than the current which flows through the photoconductive element at a preselected low level of scene brightness, such preselected low level being the minimum level for which the camera is being designed. In this manner, the trigger generation time is made to be essentially dependent only on the resistance of the element as established by the level of scene brightness, and not the impedance of the transistor to the flow of leakage current. An unexpected advantage derived from the use of a transistor of the type described above is that the gain thereof is sufficiently high so that at low levels of brightness, where the resistance of the element is high and the current therethrough limited, the transistor can furnish sufficient output current to cause deactuation of the shutter operator means.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a fuller understanding of the nature and objects of the invention, reference should be had to the following detailed description taken in connection with the accompanying drawings wherein.

Figure 1:
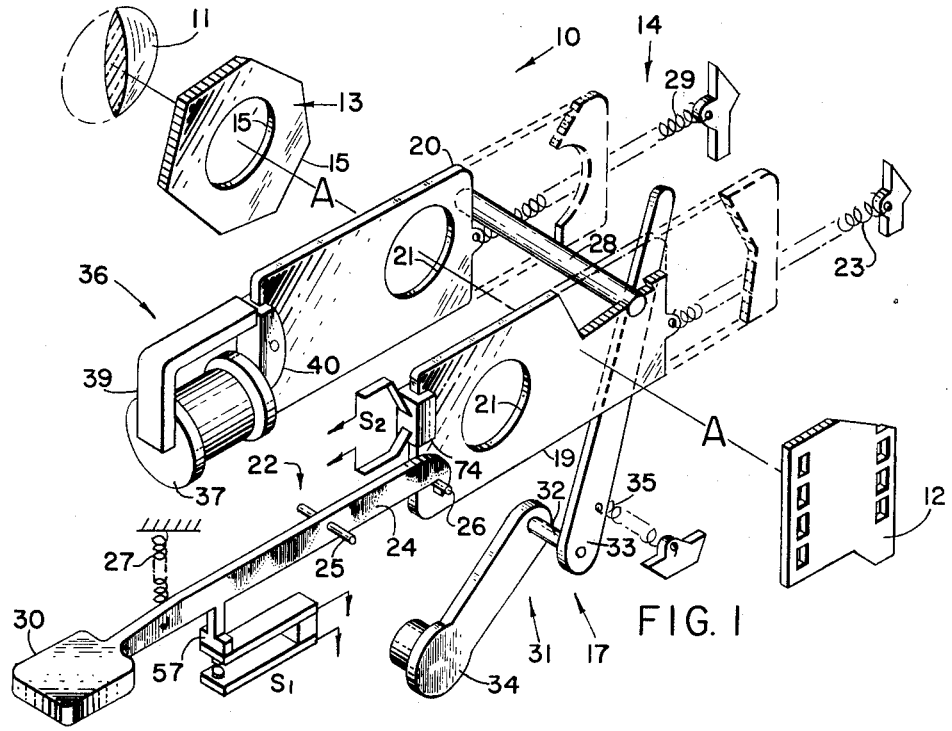
FIGURE 1 is a schematic representation of a camera of a type particularly well adapted for use with the present invention.
Figure 2:
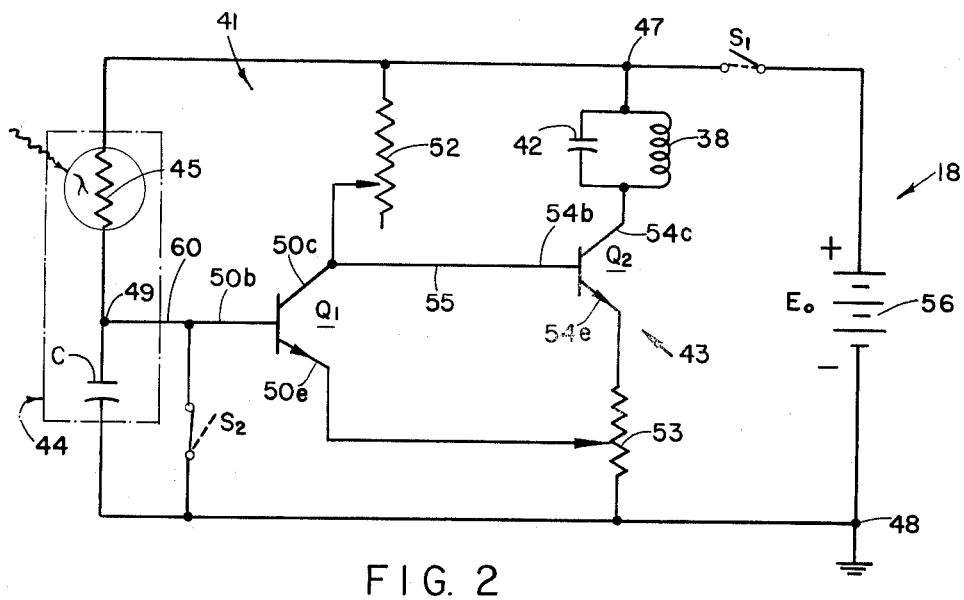
FIG. 2 is a schematic electrical diagram of the present invention.

The shutter control means to be described is shown in the drawing as embodied into a camera having a particular type of shutter means, but the latter is for the purpose of illustrating the invention in a simple environment, it being understood that other types of shutter means could also be used with the shutter control means disclosed and claimed herein in order to derive the new and improved results attendant thereto.

Referring now to FIGURE 1, camera 10 is shown schematically as including lens 11 for receiving light from a scene being photographed, and focusing it through an aperture in diaphragm means 13 onto film 12 to effect exposure of the latter by the proper operation of shutter mechanism 14 which is interposed in the optical path of the light.

Diaphragm 13 may take the form of a disc 15 mounted on the camera housing. Disc 15 contains exposure aperture 15' of preselected area aligned with the optical axis A—A of the camera.

Shutter mechanism 14 may include shutter means 17, and shutter control means 18. Shutter means 17 may take the form of a pair of planar, opaque blades 19 and 20, each provided with an exposure orifice 21, and mounted in tracks (not shown) so as to be normal to the optical axis, and reciprocable between terminal positions into intersection therewith. Each of the blades has one terminal position at which the solid portion overlies and totally blocks the exposure aperture in diaphragm means 13 (closed position), and another terminal position at which the exposure orifice is aligned with the exposure aperture (open position). Between these two terminal positions, each blade has an intermediate position at which it covers only a portion of the exposure aperture. In accordance with convention, it is assumed that the intermediate position at which half of the exposure aperture is covered is the position at which exposure is either initiated or terminated as the case may be. The blade that causes exposure to be initiated is called the "opening" blade. The terminal position at which the opening blade is closed is termed the "blocking" position, while the position intermediate the two terminal positions of the opening blade at which it initiates exposure is termed the "unblocking position." Conversely, the blade that causes exposure to be terminated is called the "closing" blade. The terminal position at which the closing blade is open is termed the "unblocking" position, while the position intermediate the two terminal positions of the closing blade at which it terminates exposure is termed the "blocking" position.

Prior to initiation of exposure, the blades are as shown in the solid lines of FIGURE 1, inspection of which will indicate that releasably coupling means 22 is engaged with opening blade 19 to hold the latter in blocking position against the bias of spring means 23 which urges the blade toward unblocking position. Coupling means 22 includes latch 24 pivotally mounted on pin 25 and engaged with latch pin 26 attached to blade 19. Latch spring 27 engaged with latch 24 urges the latter into latching contact with pin 26. Reset bar 28 is rigidly attached to the end of blade 19 opposite exposure orifice 21, and extends normal thereto into the path of movement of closing blade 20. When the opening blade is held in blocking position by coupling means 22, bar 28 is effective to engage blade 20 to maintain the latter open position against the bias of spring means 29 urging the closing blade toward its blocking position. As can be seen from the drawing, bar 28 does not interfere with the independent movement of opening blade 19 to its open position.

Such movement takes place upon manual depression of end portion 30 of latch 24, which rotates the latter about pivot 25 out of engagement with pin 26. Upon disengagement of coupling means 22 from opening blade 19, the latter moves out of blocking position toward open position, and bar 28 is no longer effective to maintain closing blade 20 in its open position. However, initial movement of opening blade 19, in response to the disengagement of coupling means 22 therefrom, is effective to cause shutter control means 18, in a manner to be described later, to retain closing blade 20 in its open position for a preselected period of time depending on the level of scene brightness. Since the opening blade moves to unblocking position while the shutter control means releasably retains the closing blade in open position, exposure is initiated. In other words, the shutter operator means is so operably associated with the shutter means, that the latter is caused to initiate exposure in response to actuation of the shutter operator means. At the end of said preseleceted period of time, shutter control means 18 causes closing blade 20 to be released thus terminating exposure when the latter is moved from open to blocking position by the action of bias spring means 29.

When exposure is terminated, blades 19 and 20 are in the position shown by the broken lines of FIGURE 1. That is to say, blade 19 is in open position and blade 20 is in blocking position, with reset bar 28 again engaged with blade 20. Having completed the exposure cycle, the blades are returned to their normal positions by reset mechanism 31 which includes reset shaft 32 rotatably mounted on the camera housing, reset lever 33 rigidly fixed to one end of shaft 32 and manual reset actuator 34 rigidly fixed to the other end of the shaft. Spring means 35 biases lever 33 to its normal position out of the path of movement of reset bar 28. However, the manual rotation of lever 33 against spring 35, achieved by the manual rotation of actuator 34 after exposure is terminated, causes lever 33 to engage bar 28 and move both blade 19 and blade 20 back to their normal, pre-exposure positions wherein the opening blade is in blocking position and the closing blade is in open position, the blades being held there by the action of coupling means 22. Upon release of actuator 34, lever 33 returns to its normal position, and the mechanism is ready for the next exposure cycle. If desired, the manual rotation of actuator 34 can be coupled to a film indexing mechanism.

Shutter control means 18 includes shutter operator means 36 actuatable to cause shutter means 17 to initiate exposure, and deactuatable after said preselected period of time to cause the shutter means to terminate exposure, as previously described. Specifically, operator means 36 may take the form of an electromagnet 37 which has solenoid 38 wound around one leg of U-shaped pole-piece 39, the free ends of which are coplanar and cooperable with magnetizable keeper 40 mounted on closing blade 20 when the latter is in open position. Pole-piece 39 and keeper 40, in such case, define a magnetic circuit of a particular reluctance such that a preselected magnetomotive force (solenoid current) applied to the magnetic circuit is sufficient to establish an attractive force between the pole-piece 39 and the keeper 40 that exceeds the separating force exerted on the closing blade by the biasing action of spring means 29 and is sufficient to resist dynamic loads due to the shock of the bottoming of the opening blade.

Shutter control means 18 further includes shutter timing apparatus 41, the purpose of which is to furnish an energizing current to the solenoid of electromagnet 37. Where the camera is to be portable and hence battery operated, it is essential to minimize current drain on the battery. With this in mind, premature release of closing blade 20 is prevented and accurate control of the time that the closing blade is held in unblocking position is obtained by rapidly energizing the solenoid just prior to the release of the opening blade, and effecting a rapid release of the closing blade by the electromagnet at the proper time.

The solenoid must be energized before opening blade 19 begins to move out of unblocking position, because this blade, through bar 28, serves to initially position keeper 40 in engagement with pole-piece 39. Once the keeper has separated even slightly from the pole-piece, the reluctance of the magnetic circuit is so high, that the solenoid current is unable to produce an attractive force that will overcome the force of spring 29 urging the closing blade to blocking position.

Rapid release of the closing blade from the solenoid can be accomplished by rapidly decreasing the current furnished to the solenoid. When the current furnished to the solenoid is rapidly reduced, a voltage is induced thereacross due to the inductance of the solenoid. The induced voltage charges capacitor 42 which shunts the solenoid and prevents the induced voltage from damaging transistor $Q_2$. The current in the solenoid however, rapidly decays to the point where the magnetic induction is so reduced that the force of attraction of the pole-piece on the keeper is equal to the spring force urging separation. At this point, there is an initial movement of keeper 40 as the closing blade is drawn toward unblocking position by the spring bias. The time between the instant that the current in $Q_2$ is rapidly reduced and the instant that release of the closing blade is accomplished is very small in terms of the ordinary exposure interval, being only a fraction of a millisecond. For this reason, it is considered that the conduction of $Q_2$ is reduced, and movement of the closing blade begins at substantially the same time.

For the reasons set forth above, namely rapid switching of the current input to the solenoid and low power consumption, shutter timing apparatus 41 takes the form of a transistorized, two-stage, modified Schmitt-type trigger circuit 43, responsive to the output voltage from network 44, for controlling the actuation and deactuation of shutter operator means 36. The voltage sensitive trigger circuit 43 has a normally not-conducting stage that includes transistor $Q_1$ preferably of a silicon type, having base, collector and emitter electrodes 50b, 50c and 50e respectively. Collector electrode 50c of $Q_1$ is connected to terminal 47 of the shutter timing apparatus by variable bias resistor 52, and emitter electrode 50e of $Q_1$ is connected to terminal 48 of the shutter timing apparatus by variable bias resistor 52. The normally conducting stage of circuit 43 includes transistor $Q_2$ having base, collector and emitter electrodes 54b, 54c, and 54e. Collector electrode 54c is connected to terminal 47 through solenoid 38 so that the latter is energized when $Q_2$ conducts. Base electrode 54b of $Q_2$ is connected to collector electrode 50c of $Q_1$ through lead 55, and emitter electrode 54e of $Q_2$ is connected through bias resistor 53 to terminal 48. It should be noted that with this arrangement there is essentially a common emitter resistor, the adjustment to resistor 53 being for the purpose of establishing the voltage at which it is desired to trigger circuit 43. While the two stages of circuit 43 have been characterized as "normally not-conducting" and "normally-conducting" it should be obvious that this characterization is applicable only when a voltage source is applied across terminals 47 and 48.

Figure 3:
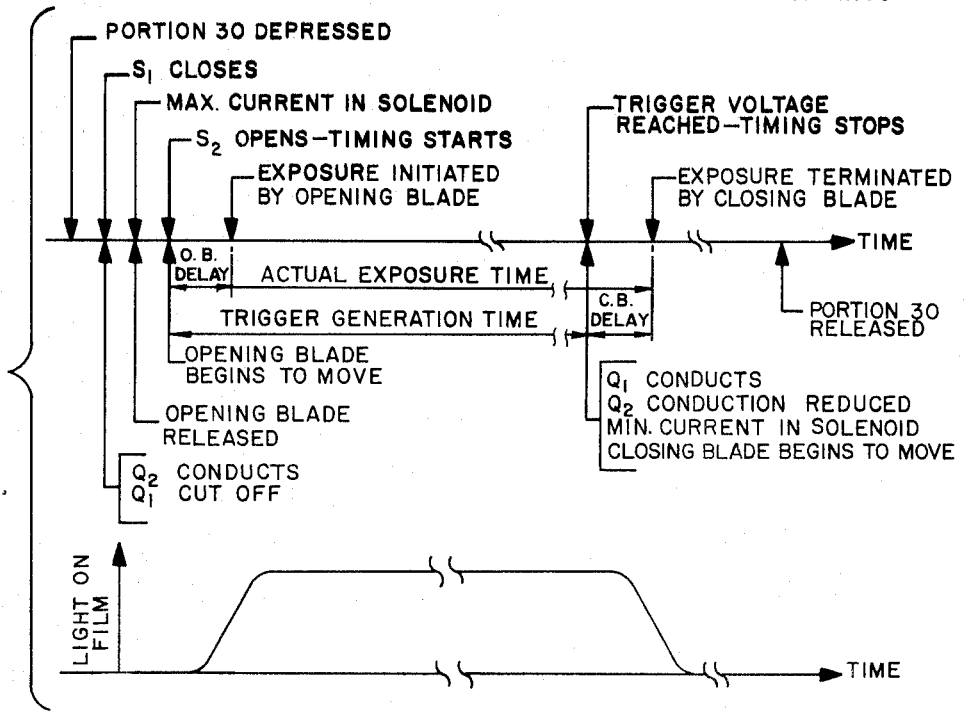
FIG. 3 is an expanded time-scale diagram for the purpose of illustrating the chronology of events associated with effecting exposure utilizing the camera of FIGURE 1 and the electrical system of FIG. 2.

In order to apply voltage source 56, shown in the form of a battery of potential $E_0$ connected from terminal 48 to terminal 47 through normally open switch S1, in such a way as to minimize current drain on the battery, actuator lever 24 is provided with switch operating arm 57 that is engageable with one of the contacts of switch S1. When the lever is manually depressed to disengage coupling means 22 from opening blade 19, the contacts of switch S1 will be closed. The sequence of events that occur as a result of the depression of end portion 30 will now be explained by making reference to the expanded time-scale diagram shown in FIG. 3. The initial depression of portion 30 closes the contacts of S1 before the rotation imparted to lever 24 effects its disengagement from pin 26. Since human reaction time involved in depressing lever 24, namely the time to depress the lever and release it, and the inertial delay of the lever in returning to its normal position, substantially exceeds the longest average exposure apt to be used under normal "snap-shot" conditions of scene brightness, the contacts of switch S1 will be closed for at least as long as the correct exposure time.

Inspection of $Q_2$ stage of circuit 43 indicates that base electrode 54b is the input to this stage, collected electrode 54c is the output, and emitter electrode 54e is common to the input and output. Resistor 52 coupled between input electrode 54b and terminal 47 acts as a fixed base resistor for providing, when S1 is closed, a fixed base current bias that causes $Q_2$ to conduct instantaneously with the closing of S1. The setting of variable resistor 52 establishes the degree to which $Q_2$ conducts so that the current through solenoid 38 can be adjusted to provide the proper magnetomotive force in the magnetic circuit of electromagnet 37 for preventing accidental release of closing blade 20 when the opening blade moves to unblocking position to initiate exposure. The flow of current through resistors 52 and 53, when $Q_2$ conducts, establishes at the collector and emitter electrodes of $Q_1$, bias voltages having first values dependent upon the magnitudes of the respective currents and resistance values.

Until the initial displacement of the opening blade out of its blocking position, conductive block 74 on the opening blade engages the contacts of S2 whereby the latter is closed. Connection 49 is at an initial value of voltage, namely ground potential, at the instant S1 is closed. When the voltage at connection 49 is at its initial value and the voltages at the collector and emitter electrodes of $Q_1$ are at their first values of bias voltage due to the conduction of $Q_2$, the collector-base and emitter-base junction of $Q_1$ are reverse biased, thus resulting in $Q_1$ being cut off. For this reason, it may be said that the bias of $Q_1$ is primarily established by the voltage at connection 49.

Meanwhile, the current through the solenoid builds rapidly to its maximum value causing the maximum retaining force to be exerted on the closing blade shortly after S1 is closed and just prior to the total disengagement of lever 24 from pin 26 which releases the opening blade for movement out of blocking position. The initial movement of the opening blade causes conductive block 74 to disengage the contacts of S2 thereby opening the same to apply the voltage source across timing network 44 and activate the same. Network 44 includes capacitor means C in series with photoconductive element 45, such as a cadmium sulfide photocell or the like exposed to light from the scene being photographed and having a resistance inversely related to the level of scene brightness. Network 44 is connected between terminals 47, 48 of the shutter timing apparatus so as to form a conventional integrator circuit whose input terminal is at 47, and whose output terminal is at 49, the connection between the capacitor means and the photoconductive element. Terminal 49 is connected by fixed impedance 60 to base electrode 50b of $Q_1$, the latter electrode constituting the input electrode of that stage.

The opening of S2 activates network 44, which is to say that the latter is caused to generate, at connection 49, a voltage having an initial value (in this case ground potential) which causes $Q_1$ to be reverse biased to cut-off, and then changes with time reaching a preselected value, termed the trigger voltage, which forward biases $Q_1$, in a period of time termed the trigger generation time. The charge on capacitor means C changes after S2 is opened in response to the flow of a transient current, a portion of which flows through $Q_1$ while the latter is reverse biased and constitutes a leakage current, and a portion of which flows through element 45.

For a given transistor, the amount of leakage current is dependent upon the degree to which the junctions of the stage are reverse biased. As the transient current builds a charge on capacitor means C, the reverse biases are steadily reduced. However, the percentage of the current flowing through $Q_1$ as leakage current that is effective in charging capacitor means C becomes substantial (exceeding 10%) at low levels of scene brightness, since the resistance of element 45 as established by the level of scene brightness, and the changing voltage difference across the element, controls the amount of current that can flow through the element. It can thus be seen that the trigger generation time will be dependent upon the parallel combination of the impedance of the stage to the flow of leakage current and the resistance of the element. As a result, the time required to reach the trigger voltage is shorter than would be the case were all of the charging current to flow through only element 45. In general, at low levels of scene brightness the trigger generation time is less than the correct exposure time because of the inherent nonlinear nature of the photoconductive element, without considering the effect of leakage current through $Q_1$. When the latter is considered, the trigger generation is still further shortened and substantial underexposure results.

To minimize the effect of leakage current on the trigger generation time at low levels of scene brightness, $Q_1$ is selected on the basis of its leakage current at reverse bias conditions imposed by the other elements of the shutter timing apparatus. Thus, the transistor $Q_1$ is a type having a leakage current associated therewith which is substantially smaller (less than 10%) than the current which flown through element 45 when the level of scene brightness is at the desired minimum level of brightness for which the camera is designed. Thus, at levels of brightness greater than such minimum level, substantially all of the transient current serving to charge capacitor means C flows through the photoconductive element, and the trigger generation time is essentially independent of the flow of leakage current. An example of a transistor suitable for this purpose is a silicon-planar transistor, similar to a 2N930.

When the voltage at connection 49 reaches the trigger voltage, it causes the emitter-base junction of $Q_1$ to be forward biased. Now, element 45 functions like a base resistor whose value is dependent upon the level of scene brightness and provides base current bias that causes $Q_1$ to conduct producing collector current at the output electrode thereof which flows through resistor 52 increasing the voltage drop thereacross and lowering the voltage at the input electrode of $Q_2$. This reduces the forward bias on $Q_2$ thus decreasing the flow of current through the latter and causing a reduction in the voltage drop across bias resistor 53 thereby increasing the forward bias on $Q_1$ even more. This regenerative feedback between the stages of voltage sensitive trigger circuit 43 will cause conduction to switch rapidly from $Q_2$ to $Q_1$, if sufficient collector current is available in $Q_1$. Assuming this is true, the different flows of current through bias resistors 52 and 53 after switching takes place establish second values of bias voltages at electrodes $50c$ and $50e$ of $Q_1$ such that the conduction of $Q_2$ is severely and rapidly reduced thereby rapidly deenergizing solenoid 38 to effects a sharp release of the closing blade.

When the closing blade is released, it begins to move out of unblocking position, and will terminate exposure at its blocking position as explained previously. Thus, the shutter means terminates exposure in response to deactuation of the shutter operator means. Referring again to FIG. 3, it can be seen that the time interval between when timing starts (the opening of S2) and when timing stops (the trigger voltage is reached), will be exactly the same as the time interval between when exposure is initiated and when exposure is terminated, provided only that the opening blade delay is the same as the closing blade delay, even though the two time intervals are not concurrent throughout. This disclosure assumes the delay times are essentially the same, so that the actual exposure time is essentially the same as the trigger generation time.

Referring again to FIG. 3, it is apparent that the time interval between the release of the opening blade and its initial movement to open S2 can be made extremely small by proper bias applied to the blade. Furthermore, the time between the closing of S1 and the attainment of maximum restraining force on the closing blade can likewise be made extremely small by various expedients. Thus, all the events that occur between the closing of S1 and the opening of S2 can be said to occur substantially at the same time, particularly since the time interval involved is a minute fraction of the actual exposure time. This disclosure therefore assumes that the actual exposure time is essentially the time that the current through the solenoid is sufficinet to maintain the closing blade in unblocking position; or in other words, the time that the shutter operator means is actuated.

As indicated previously, the output current of $Q_1$ when the latter is forward biased into conduction must exceed a predetermined value in order to reduce the conduction of $Q_2$ to the point where spring means 29 becomes effective to separate keeper 40 from pole-piece 39 of the electromagnet. In other words, it is quite possible for the voltage at connection 49 to reach the trigger voltage and forward bias $Q_1$ without causing release of the closing blade. This can occur when the resistance of element 45 is so high (low levels of scene brightness) that the current that is able to flow therethrough to establish fixed base current bias conditions for the $Q_1$ stage cannot cause the stage to produce an output current that exceeds the necessary predetermined value. Stated otherwise, the gain of the $Q_1$ stage must be sufficient so that when the level of scene brightness is at the minimal design level and the current through the element is at its lowest value, the output current must exceed the predetermined value identified above.

An unexpected advantage in this area is obtained by the use of a silicon planar transistor for $Q_1$ since the current gain of transistors of this type is high enough to achieve the desired results, even when the level of scene brightness is reduced to 0.195 candles/ft.$^2$.

Those skilled in the art can now appreciate the contribution made by the present invention. Not only is the trigger generation time made independent of the leakage current due to the reverse biasing of $Q_1$, but positive release of the closing blade is assured when the electrical network generates the trigger voltage.

It should be understood that $Q_1$ need conduct only to the degree necessary to effect a reduction in the conduction of $Q_2$ sufficient for the magnetic induction of the electromagnet to be reduced to the point where the spring bias on the closing blade urging the latter toward blocking position overcomes the magnetic force exerted on the closing blade by the magnet. In other words, $Q_2$ need not be biased to cut-off to effect blade release.

Since certain changes may be made in the above method and apparatus without departing from the scope of the invention herein involved, it is intended that all matter contained in the above description or shown in the accompanying drawings shall be interpreted as illustrative and not in a limiting sense.

What is claimed is:

1. In a camera having shutter means for controlling exposure in order to photograph a scene that can have different levels of brightness; and shutter operator means actuatable to cause said shutter means to initiate exposure and deactuatable to cause the shutter means to terminate exposure so that the exposure time is determined essentially by the time said shutter operator means is actuated; light responsive shutter control means comprising:

(a) a voltage sensitive trigger circuit, including a transistor stage having an input, for actuating and deactuating said shutter operator means;

(b) means for causing said voltage sensitive trigger circuit to actuate said shutter operator means;

(c) an electrical network including capacitor means coupled to a photoresponsive element that is exposed to light from said scene and has a resistance inversely related to the level of scene brightness;

(d) means coupling the capacitor means of said network to said input;

(e) said network being so constructed and arranged that when activated, the charge on said capacitor means begins to change causing the voltage at said input to change from an initial value, which reverse biases said stage to cut-off, to a preselected value termed the trigger voltage, which forward biases said stage into conduction, in a period of time termed the trigger generation time;

(f) means to activate said network substantially at the same time said voltage sensitive trigger circuit actuates said shutter operator means;

(g) said voltage sensitive trigger circuit deactuating said shutter operator means when said stage is forward biased into conduction by the trigger voltage, whereby the actuation time of said shutter operator means, and consequently the exposure time, is essentially equal to the trigger generation time;

(h) the charge on said capacitor means changing, after said network is activated, in response to the flow of a transient current, a portion of which flows through said stage while the latter is reverse biased and constitutes a leakage current, and a portion of which flows through said element whereby the trigger generation time is dependent upon the resistance of said element, as established by the level of scene brightness, as well as the impedance of said stage to the flow of leakage current and is shorter than would be the case were all of the transient current to flow through only said element; and (i) means to minimize the effect of leakage current on the trigger generation time.

2. In a camera having shutter means for controlling exposure in order to photograph a scene that can have different levels of brightness; and shutter operator means actuatable to cause said shutter means to initiate exposure and deactuatable to cause the shutter means to terminate exposure so that the exposure time is determined essentially by the time said shutter operator means is actuated; light responsive shutter control means comprising:

(a) a voltage sensitive trigger circuit, including a transistor stage having an input, for actuating and deactuating said shutter operator means;

(b) means for causing said voltage sensitive trigger circuit to actuate said shutter operator means;

(c) an electrical network including capacitor means coupled to a photoresponsive element that is exposed to light from said scene and has a resistance inversely related to the level of scene brightness;

(d) means coupling the capicitor means of said network to said input;

(e) said network being so constructed and arranged that when activated, the charge on said capacitor means begins to change causing the voltage at said input to change from an initial value, which reverse biases said stage to cut-off, to a preselected value termed the trigger voltage, which forward biases said stage into conduction, in a period of time termed the trigger generation time;

(f) means to activate said network substantially at the same time said voltage sensitive trigger circuit actuates said shutter operator means;

(g) said voltage sensitive trigger circuit deactuating said shutter operator means when said stage is forward biased into conduction by the trigger voltage, whereby the actuation time of said shutter operator means, and consequently the exposure time, is essentially equal to the trigger generation time;

(h) the charge on said capacitor means changing, after said network is activated, in response to the flow of a transient current, a portion of which flows through said stage while the latter is reverse biased and constitutes a leakage current, and a portion of which flows through said element whereby the trigger generation time is dependent upon the resistance of said element, as established by the level of scene brightness, as well as the impedance of said stage to the flow of leakage current and is shorter than would be the case were all of the transient current to flow through only said element; and (i) said transistor stage being of the type having a leakage current associated therewith which is substantially smaller than the current which flows through said element when the level of scene brightness is at a particular level whereby at levels greater than said particular level substantially all of said transient current flows through said element and the trigger generation time is essentially independent of the flow of leakage current in said transistor stage during the time that it is reverse biased.

3. Apparatus in accordance with claim 2 wherein said particular level is of the order of magnitude of 0.195 candle/ft.$^2$ and the leakage current is less than 0.1 $\mu$a.

4. Apparatus in accordance with claim 2 wherein said particular level is of the order of magnitude of 0.195 candle/ft.$^2$ and the leakage current is less than ten percent of the current that flows through said element at said particular level.

5. Apparatus in accordance with claim 4 wherein said transistor is silicon.

6. In a camera having shutter means for controlling exposure in order to photograph a scene that can have different levels of brightness; and shutter operator means actuatable to cause said shutter means to initiate exposure and deactuatable to cause the shutter means to terminate exposure so that the exposure time is determined essentially by the time said shutter operator means is actuated; light responsive shutter control means comprising:

(a) a first transistor stage for actuating said shutter operator means when said stage is biased into conduction and for deactuating said shutter operator means when said stage is biased to cut-off;

(b) means for causing said first stage to be biased into conduction whereby said shutter operator means is actuated and exposure is initiated;

(c) a second transistor stage coupled to said first stage so that said second stage, when reverse biased to cut-off, effects conduction of said first stage; and, when forward biased and conducting beyond a predetermined degree, biases said first stage to cut-off terminate exposure;

(d) an electrical network including capacitor means, a photoresponsive element exposed to light from said scene and having a resistance inversely related to the level of scene brightness, and a connection between said capacitor means and said element;

(e) means connecting said connection to said second stage so that the bias thereon is primarily established by the voltage at said connection;

(f) said network being so constructed and arranged that when activated, the charge on said capacitor means begins to change causing the voltage at said connection to change from an initial value, which reverse biases said second stage to cut-off, to a preselected value termed the trigger voltage, which forward biases said second stage, in a period of time termed the trigger generation time;

(g) the charge on said capacitor means changing, after said network is activated, in response to the flow of a transient current, a portion of which flows through said second stage while the latter is reverse biased and constitutes a leakage current, and a portion of which flows through said element whereby the trigger generation time is dependent upon the resistance of said element as established by the level of scene brightness as well as the impedance of said stage to the flow of leakage current and is shorter than would be the case were all of the transient current to flow though only said element;

(h) means to activate said network substantially at the same time said first stage is caused to be biased into conduction for causing said second stage to be reverse biased to cut-off for a period of time equal to the trigger generation time whereby said shutter operator means is actuated for a period of time at least equal to the trigger generation time;

(i) said second stage being of the type having a leakage current associated therewith which is substantially smaller than the current which flows through said element when the level of scene brightness is at a particular level whereby at levels greater than said particular level substantially all of said transient current flows through said element and the trigger generation time is essentially independent of the flow of leakage current in said second stage during the time that it is reverse biased; and (j) said second stage also being of the type having sufficient gain to cause it to conduct beyond said predetermined degree when the level of scene brightness is greater than said particular level.

7. In a camera having shutter means for controlling exposure in order to photograph a scene that can have different levels of brightness; and shutter operator means actuatable to cause said shutter means to initiate exposure and deactuatable to cause the shutter means to terminate exposure so that the exposure time is determined essentially by the time said shutter operator means is actuated; light responsive shutter control means comprising:

(a) a first transistor stage for actuating said shutter operator means when said stage is biased into conduction and for deactuating said shutter operator means when said stage is biased to cut-off;

(b) means for causing said first stage to be biased into conduction whereby said shutter operator means is actuated and exposure is initiated;

(c) a second transistor stage coupled to said first stage so that said second stage, when reverse biased to cut-off, effects conduction of said first stage; and, when forward biased into conduction, biases said first stage to cut-off to deactuate said shutter operator means and thus terminate exposure;

(d) an electrical network including capacitor means, a photoresponsive element exposed to light from said scene and having a resistance inversely related to the level of scene brightness, and a connection between said capacitor means and said element;

(e) means connecting said connection to said second stage so that the bias thereon is primarily established by the voltage at said connection;

(f) said network being so constructed and arranged that when activated, the charge on said capacitor means begins to change causing the voltage at said connection to change from an initial value, which reverse biases said second stage to cut-off, to a preselected value termed the trigger voltage which forward biasess said second stage into conduction, in a period of time termed the trigger generation time;

(g) the charge on said capacitor means changing, after said network is activated, in response to the flow of a transient current, a portion of which flows through said second stage while the latter is reverse biased and constitutes a leakage current, and a portion of which flows through said element whereby the trigger generation time is dependent upon the resistance of said element as well as the impedance of said stage to the flow of leakage current and is shorter than would be the case were all of the transient current to flow though only said element;

(h) means to activate said network substantially at the same time said first stage is caused to be biased into conduction for causing said second stage to be reverse biased to cut-off for a period of time equal to the trigger generation time whereby said shutter operator means is actuated for a period of time at least equal to the rigger generation time; and (i) said second stage being of the type having a leakage current associated therewith which is substantially smaller than the current which flows through said element when the level of scene brightness is at a particular level whereby at levels greater than said particular level substantially all of said transient current flows through said element and the trigger generation time is essentially independent of the flow of leakage current in said second stage during the time that it is reverse biased.

8. In a camera having shutter means for controlling exposure in order to photograph a scene that can have different levels of brightness; and shutter operator means actuable to cause said shutter means to initiate exposure and deactuatable to cause the shutter means to terminate exposure so that the exposure time is determined essentially by the time said shutter operator means is actuated; light responsive shutter control means comprising:

(a) a pair of terminals;

(b) a first transistor having an input electrode constituted by the base thereof, an output electrode, and a common electrode;

(c) means coupling said shutter operator means between said output electrode and one of said terminals;

(d) means coupling said common electrode to the other terminal;

(e) means coupling a fixed base resistor between said input electrode and said one terminal for providing, when a voltage source is connected between said terminals, a fixed base current bias that causes said first transistor to conduct and actuate said shutter operator means to initiate exposure;

(f) a second transistor having an input electrode constituted by the base thereof, an output electrode and a common electrode;

(g) means coupling the output electrode of said second transistor to the input electrode of said first transistor so that the output current of said second transistor flows through said fixed base resistor and reduces the forward bias on said first transistor to deactuate said shutter operator means and terminate exposure when said output current exceeds a predetermined value;

(h) means coupling the common electrode of said second transistor to the common electrode of said first transistor;

(i) an electrical network connected between said terminals;

(j) said network including capacitor means, a photoresponsive element exposed to light from said scene and having a resistance inversely related to the level of scene brightness, said element being connected to said one terminal, and a connection between said capacitor means and said element;

(k) means connecting said connection to the input electrode of said second transistor;

(l) said network being so constructed and arranged that when activated, the voltage at said connection has an initial value which reverse biases said second transistor to cut-off and then changes with time reaching a preselected value, termed the trigger voltage, which forward biases said second transistor in a period of time termed the trigger generation time;

(m) the charge on said capacitor means changing, after said network is activated, in response to the flow of a transient current, a portion of which flows through said second transistor while the latter is reverse biased and constitutes a leakage current, and a portion of which flows through said element whereby the trigger generation time is dependent upon the resistance of said element as established by the level of scene brightness as well as the impedance of said stage to the flow of leakage current and is shorter than would be the case were all of the transient current to flow through only said element;

(n) means to connect a voltage source between said terminals and to activate said network substantially at the same time said first stage is caused to be biased into conduction whereby said first transistor conducts and said shutter operator means is actuated for a period of time at least equal to the trigger generation time;

(o) said second transistor being of the type having a leakage current associated therewith which is substantially smaller than the current which flows through said element when the level of scene brightness is at a particular level whereby at levels greater than said particular level substantially all of said transient current flows through said element and the trigger generation time is essentially independent of the flow of leakage current in said second transistor during the time that it is reverse biased;

(p) said element functioning with said second transistor, after the latter is forward biased, like a base resistor whose value is dependent upon the level of scene brightness for providing a base current bias that causes said second transistor to conduct producing an output current that flows through said fixed base resistor; and (q) said second transistor also being of the type having such gain that said output current exceeds said predetermined value when the level of scene brightness is greater than or equal to said particular level.

9. Apparatus in accordance with claim 8 wherein said second transistor is a silicon type.

10. Apparatus in accordance with claim 9 wherein said first transistor is a germanium type.

11. A method for using a camera having shutters means for controlling exposure in order to photograph a scene that can have different levels of brightness, wherein said camera includes: shutter operator means actuatable to cause said shutter means to initiate exposure and deactuatable to cause the shutter means to terminate exposure; a voltage sensitive trigger circuit, including a transistor stage having an input, for actuating and deactuating said shutter operator means; means for causing said voltage sensitive trigger circuit to actuate said shutter operator means; an electrical network including capacitor means coupled to a photoresponsive element that is exposed to light from said scene and has a resistance inversely related to the level of scene brightness; means coupling the capacitor means of said network to said input; said network being so constructed and arranged that when activated, the charge on said capacitor means begins to change causing the voltage at said input to change from an initial value, which reverse biases said stage to cut-off, to a preselected value termed the trigger voltage, which forward biases said stage into conduction, in a period of time termed the trigger generation time; means to activate said network substantially at the same time said voltage sensitive trigger circuit actuates said shutter operator means; said voltage sensitive trigger circuit deactuating said shutter operator means when said stage is forward biased into conduction by the trigger voltage, whereby the actuation time of said shutter operator means and consequently the exposure time is essentially equal to the trigger generation time; the charge on said capacitor means changing, after said network is activated, in response to the flow of a transient current, a portion of which flows through said stage while the latter is reverse biased and constitutes a leakage current, and a portion of which flows through said element whereby the trigger generation time is dependent upon the resistance of said element as well as the impedance of said stage to the flow of leakage current and is shorter than would be the case were all of the transient current to flow through only said element; said method comprising the steps of:

(a) selecting a transistor stage having a leakage current associated therewith which is substantially smaller than the current which flows through said element when the level of scene brightness is at a particular level; and (b) utilizing the camera to photograph scenes at levels of brightness greater than said particular level whereby substantially all of said transient current flows through said element and the trigger generation time is essentially independent of the flow of leakage current in said stage during the time the latter is reverse biased.

12. In a shutter mechanism for a camera in which the exposure time is substantially equal to the energization time of an electromagnet engageable with the exposure terminating means of said mechanism and wherein the energization time is the time required for the voltage on a capacitor to reach a trigger level due to the flow of current through a photoconductor exposed to the scene being photographed, such current starting substantially at the same time exposure is initiated; a voltage sensitive trigger circuit comprising:

(a) a first transistor stage which conducts when exposure is initiated, said electromagnet being in the output circuit of said first stage and being energized when the latter conducts;

(b) a second transistor stage, to the input of which said capacitor is connected when exposure is initiated, for biasing off said second stage until the voltage on said capacitor reaches said trigger level;

(c) a regenerative feedback connection between said stages for causing said first stage to stop conducting when the second stage starts conducting thereby rapidly deenergizing said electromagnet; and (d) means for minimizing the contribution to the voltage on said capacitor due to the flow of leakage current through said second stage while the latter is biased off by the voltage on said capacitor.

13. Apparatus in accordance with claim 12 wherein said second stage has a leakage current associated therewith which is substantially smaller than the current which flows through said photoconductor when the level of scene brightness is at a particular level.

14. Apparatus in accordance with claim 13 wherein said particular level is one at which the current flowing through said photoconductor is about ten times the leakage current.

15. Apparatus in accordance with claim 14 wherein said second transistor is a silicon planar transistor.

References Cited by the Examiner

UNITED STATES PATENTS 3,020,816   2/62   Frenk _____ 95—58
3,064,167   11/62  Hoerni _____ 317—24 X

OTHER REFERENCES

Fairchild publication, Silicon Planar Transistors, page 6, copyright 1961.

NORTON ANSHER, *Primary Examiner.*